United States Patent Office 3,392,995
Patented July 16, 1968

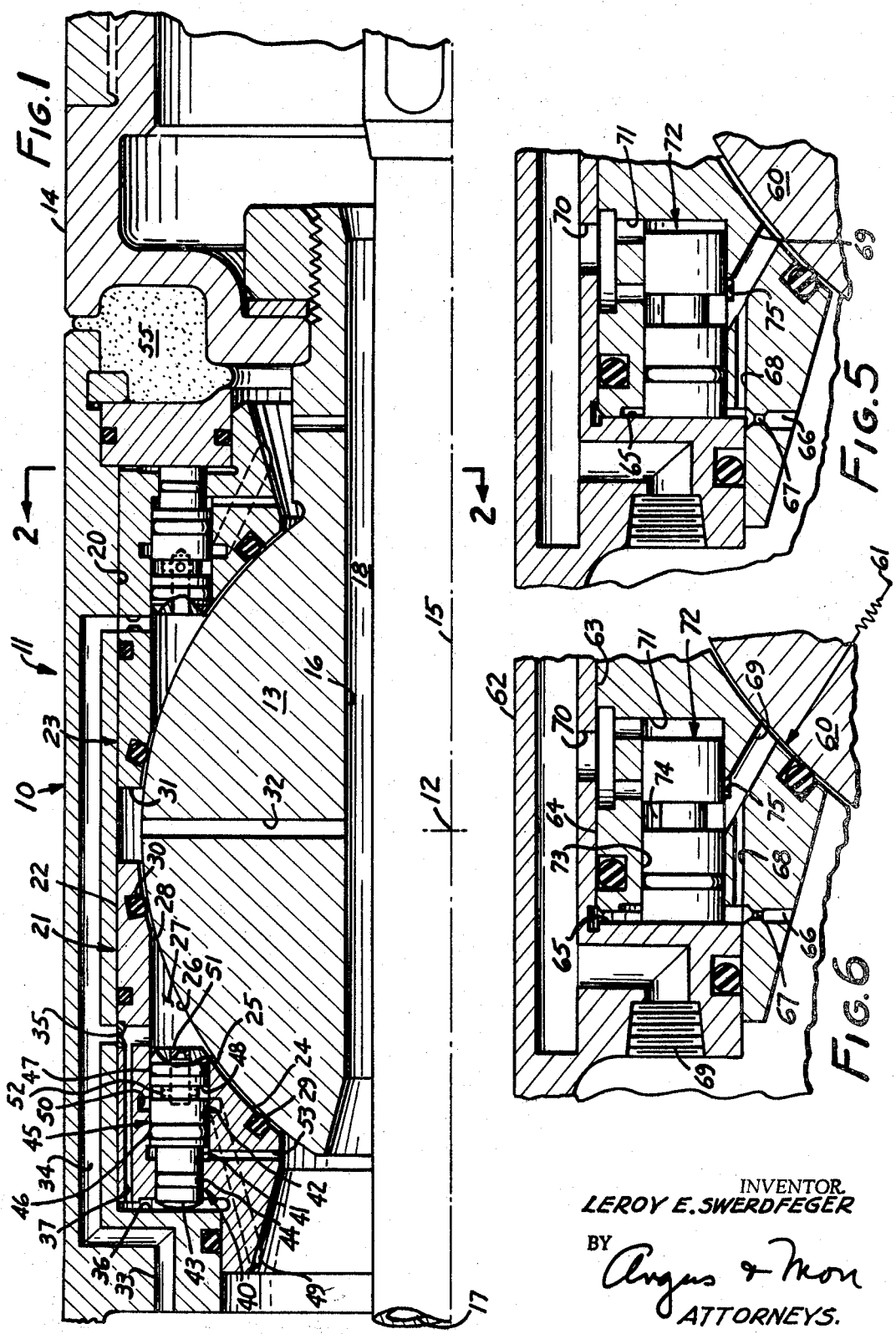

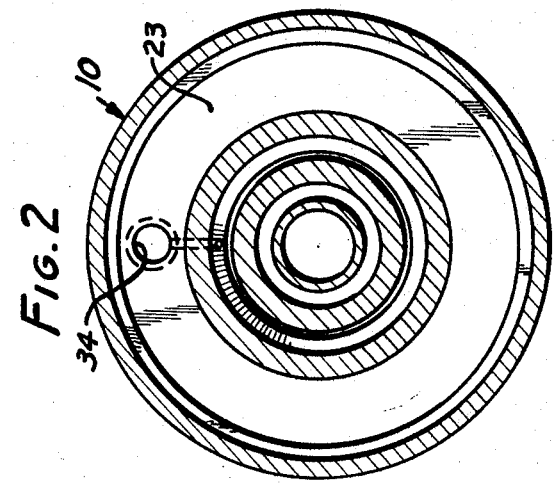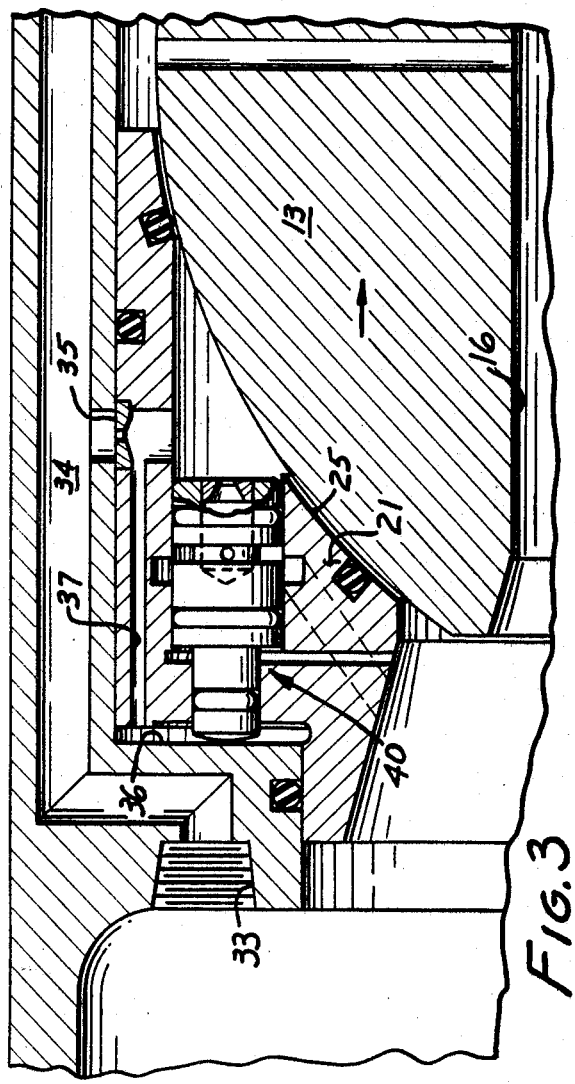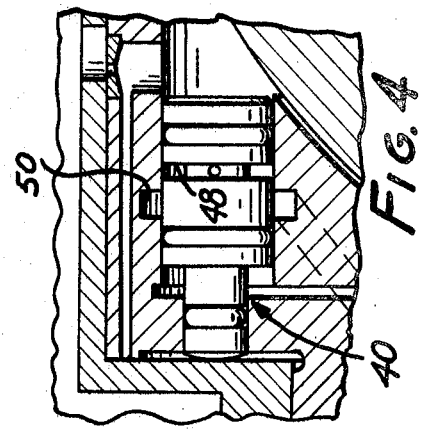

3,392,995
PRESSURE BALANCED BALL JOINT
Leroy E. Swerdfeger, Upland, Calif., assignor to Malan Vibrator Co., Inc., South El Monte, Calif., a corporation of California
Filed Aug. 23, 1966, Ser. No. 574,410
11 Claims. (Cl. 285—261)

This invention relates to a ball joint and, in particular, to a ball joint useful in providing a free angular motion in joints wherein substantial axial loads may be exerted.

Although this application will principally discuss a ball joint used in combination with a vibrator of the class which exerts unbalanced lateral forces on a surrounding environment in which it is immersed, it will be understood that this invention is useful in any installation where axial loads are imposed on the joint and lateral forces are also exerted as a torque around the center of the ball.

In conventional ball joints, it is customary for one body (such as a vibrator) to include a socket and another object (such as a handle) to include a ball, the ball fitting in the socket for angular motion around the center of the ball and for axial motion along with the center of the ball. A direct fit is suitable for devices in which the accelerations, velocities and forces are relatively small. However, as these functions increase in magnitude, there arise substantial problems of galling the adjacent surfaces and of reduction in efficiency. In many installations it is desired to keep the ball joint free for the said motions, and this freedom is greatly inhibited by surface-to-surface contact under strong pressures.

In order to overcome the problems of sticking and galling, especially when axial loads are exerted, it has previously been attempted to provide a fluid pad wherein a fluid pressure exerted between the surfaces of the socket and ball will increase as the axial force on the socket increases. Ordinarily, this is caused by utilizing the contiguous surfaces as one orifice of a fluid system, whereby the choking down of this orifice by the relative motion between the surfaces causes the pressure between the surfaces to increase. This technique works reasonably well but involves problems of its own, such as lag in the increase of pressure whereby galling and sticking may continue to occur. Also, of course, direct contact may occur, which is undesirable.

It is an object of this invention to provide a piloted type of ball joint wherein a plunger socket member is shiftable between a ball attached to one body and a housing attached to another body whereby to provide rapid reaction between the surfaces, avoiding the tendency to gall and stick and tending to keep the ball centered in the socket at all times.

A ball joint according to this invention comprises a ball attached to one body and a housing attached to another. There is a cylinder in the housing within which is fitted a plunger socket member. The socket member makes a fluid sealing fit with the wall of the cylinder and includes a socket surface inside. There are two of these plunger socket members which face each other, and face the ball on opposite sides of its center. The function of these plunger socket members is to maintain the ball centered relative to themselves and therefore to the housing, thereby to keep the socket free.

Associated between each plunger socket member and the housing is a poppet valve adapted to control pressure exerted in a control chamber formed between the socket surface and the ball, these valves being in push-pull relationship with each other so as to tend to cause the ball to be centered.

According to a preferred but optional feature of the invention, the poppet valve directly controls the pressure of the liquid in the control chamber, and also the pressure in a bias chamber behind the respective plunger socket members so as to maintain the ball and the respective plunger socket member freely floating within the housing.

According to another optional feature of the invention, the poppet valve includes an orifice means which causes the region between the socket surface and the ball to be a segment in a balanced fluid circuit.

The above and other features of this invention will be fully understood from the following detailed description and the accompanying drawings in which:

FIG. 1 is a half axial section of the presently preferred embodiment of the invention;
FIG. 2 is a cross-section taken at line 2—2 of FIG. 1;
FIG. 3 shows the embodiment of FIG. 1 in another operative position;
FIG. 4 is a fragmentary side view of a portion of FIG. 1 showing the device in another operative position; and
FIGS. 5 and 6 are fragmentary axial cross-sections showing another embodiment of the invention in two different operating conditions.

FIG. 1 shows a housing 10 which is adapted to be attached to an object such as a vibrator or the like (not shown). The subject of this invention is a joint 11 which enables housing 10 freely to rotate about center 12 of a ball 13. This ball is attached to a handle 14 which may be in the nature of a plunger rod or any other desired object. The handle may be pushed and pulled in an axial direction along central axis 15 so as to move the housing axially and while this motion goes on, the joint keeps the housing freely rotatably movable around the ball.

The joint has a central passage 16 which includes a concentric pressure supply hose 17 which may carry any desired fluid under pressure to power whatever object is carried by the device, the spacing between the wall of the central passage and the supply hose comprising, if desired, an exhaust passage 18. This exhaust passage is ordinarily maintained at atmospheric pressure but by appropriate use of pressure limiting devices and controllers, a higher pressure may be utilized if desired.

The housing includes a cylinder 20 which has a smooth cylindrical bore. The ball is placed within the cylinder, and has a lesser lateral dimension than the cylinder.

A plunger socket member 21 has an outer periphery 22 which makes a smooth fluid sealing fit with the wall of cylinder 20. There are a pair of these socket members 21 and 23. They are mirror images of each other, so that only socket member 21 will be described in detail. It will be noted that these face each other across the ball from opposite sides of the center so as to be in push-pull relationship with each other, and are spaced axially from one another.

Socket member 21 includes a socket surface 24 having center 12 when the device is entirely centered. In the normal situation shown in FIG. 1 there will be a clearance 25 between socket surface 23 and outer surface 26 of the ball. A control chamber 27 is thereby formed between surfaces 24 and 26 and between O-rings 29 and 30, which chamber is enlarged by an annular recess 28. There is a spacing 31 between the two socket members which is vented to atmosphere by vent passage 32.

The plunger socket member includes a pressure supply port 33 which enters recess 28 and at all axial positions of socket member 21 is in fluid communication with a pressure supply line 34 formed in the housing. A primary orifice 35 is formed in the supply port.

A bias chamber 36 is formed between the housing and a laterally-extending face on the socket member. Pressure in the bias chamber will tend to move socket member 21 toward the ball. The area of this bias chamber, which is preferably an annular chamber, is greater than the lateral area of control chamber 27, so that there is a relatively small net force toward the ball. Pressure for the bias chamber is supplied by bias line 37 which tees off pressure supply port 33.

A control valve 40 fits in a valve bore 41. This bore includes a counterbore 42. In bore 41 there is fitted a stem 43 which bears against the housing wall of the bias chamber. An O-ring 44 seals around this stem. A poppet 45 which is fixed to this stem, fits in the enlarged counterbore and is sealed by a pair of O-rings 46, 47. The wall of the counterbore includes a peripheral exhaust groove 48 which connects to exhaust passage 18 through an exhaust port 49. The poppet includes control groove 50 which is adapted to overlap and underlap the exhaust port 49 so as respectively to permit and prohibit flow from the control chamber to the exhaust port 49. A secondary orifice 51 is carried by the poppet and connects by passage 52 to the control groove. It will thereby be seen that as plunger socket member 21 shifts axially relative to the housing and to the poppet, a variation in the pressure of the control chamber 27 can be attained, the grooves acting as a variable orifice for this purpose in series with the primary and secondary orifices.

The counterbore is vented by a vent port 53 at the region surrounding the junction of the stem and the enlarged portion of the poppet. It will be seen that this vent and the pressure in the control chamber provides a differential pressure which assures that the poppet will always firmly bear against the housing. Therefore, the poppet becomes in essence a continuation of the housing. This construction is to be preferred over making the poppet unitary with any structure, because relative rotation of parts can occur without breakage, and also replacement of parts and seals is facilitated.

A flexible seal 55 seals between handle 14 and the housing so as to enable the housing to rotate around the center of the ball. It is to be understood that in all of the drawings, the surfaces are fully peripheral and that any number of control valves may be provided depending upon the results to be obtained. It will also be recognized that each of the socket members has associated with it a control valve and that these are in push-pull relationship with each other, because as the ball moves axially toward one end, it moves away from the other.

Another embodiment of the invention is shown in FIGS. 5 and 6. The purpose of the device is the same as that in FIG. 1, but there is a difference in the manner in which the fluid is controlled. A ball 60 having a center 61 fits within a housing 62 having a cylinder 63. A plunger socket member 64 fits in the bore as in FIG. 1 and forms a control chamber between its socket surface and the outer surface of the ball as in FIG. 1, the numbers being utilized wherever possible.

As in the device of FIG. 1 there is a bias chamber 65 which is connected to a vent port 66 that discharges into exhaust passage 18 through an orifice 67. The bias chamber is connected by a line 68 and port 69 to the control chamber so that it always has the same pressure, and this is maintained by orifice 67, it being understood that this orifice permits a steady bleed of pressure. A pressure supply line discharges into a pressure port 70 which communicates to a poppet load chamber 71 facing a poppet 72 thereby biasing the poppet toward the left in FIG. 5. The poppet fits in a valve bore 73 and includes a control groove 74 on its surface adapted to interact with a control groove 75 in the bore. These grooves are adapted to overlap or underlap thereby to permit or prevent communication with groove 74, respectively. It will thereby be seen that the poppet is biased against the housing continuously to form a portion thereof; that the bias chamber has substantially the same pressure as the control chamber, and that these pressures are functions of the relative position of the plunger socket member and the poppet.

Only one-half of the construction in FIGS. 5 and 6 is shown, it being understood the surfaces being fully peripheral. Any number of poppets may be used, and the construction is duplicated on opposite sides of the center of the ball as a mirror image. There is also provided a flexible seal for permitting rotation of the housing lateral to the central axis, as in seal 55.

The operation of the embodiment of FIGS. 1–4 will now be described. FIG. 1 illustrates the device in its normal properly adjusted condition with a clearance formed between the socket surface 24 and outer surface 26 and with a spacing between the end of the bias chamber and the plunger socket member. This condition is duplicated at both ends. In this condition the plunger socket member is biased toward the ball, and the grooves 48 and 50 are out of connection with each other so that pressure can build up in the control chamber to a pressure equal to that in the bias chamber. The device is now entirely symmetrical and in its stable configuration. There are no surfaces galling each other and the device is in fine balance. Now assume that in FIG. 3 the handle is pulled from the right thereby forcing the ball against socket member 23. The housing will move relatively to the left. Because of the relatively larger pressure in the bias chamber, socket member 21 will tend to follow the ball. As soon as it does so, then peripheral exhaust groove 48 moves to the right relative to control groove 50 and overlaps the same. This connects control chamber 27 to exhaust but through the primary and secondary orifices, so that there is not a sudden loss of pressure. This loss of pressure in control chamber 28 occurs concurrently with an increase in the corresponding chamber on the opposite side of the ball at socket member 23, so that the ball is immediately impelled to move to the left in FIG. 3, thereby tending to restore the conditions in FIG. 1.

Now assume that the ball had been moved to the left in FIG. 3 instead of to the right. The left hand poppet valve would have assumed the conditions shown in FIG. 4 in which the peripheral exhaust groove 48 would have been moved even farther out of registration from that of groove 50, thereby maintaining the maximum pressure in control chamber 27 while a decrease in corresponding pressure occurs in the chamber on the opposite side of the ball, thereby tending again to center the devices. This is a very swift reaction depending solely upon the relative positions of the grooves, and the device tends to maintain itself centered but with no reaction between adjacent wearing surfaces of the ball and socket member.

A somewhat similar technique is utilized in the device of FIGS. 5 and 6. In FIG. 5 there is shown an out-of-balance situation with the ball forced to the left. The joint is out of balance. The plunger socket member has been moved toward the end of the bias chamber and the grooves have overlapped so as to apply pressure to the control chamber and also to the bias chamber. The control chamber therefore has a higher pressure and this will be accompanied by a corresponding drop in pressure on the other side as will be understood from an examination of FIG. 6 in which the balanced condition is shown.

In the balanced condition, the ball is centered with the control grooves out of communication with each other and dropped to exhaust pressure through the vent port. This is the same on both sides and the ball remains centered with the control chamber at atmospheric pressure. Were the device to become further uncentered by pulling the ball to the right (which would be the condition in the other half of FIG. 5), the control grooves would be even farther out of balance so as not to oppose the pressure conditions in the opposite control chamber.

Therefore, in both of these embodiments there is a simple push-pull relationship on opposite sides of the ball tending to keep the ball centered in the housing. The pressure in the control chamber is swiftly adjusted by a simple and readily-replaceable poppet valve. The pressure in the bias chambers is always of the same nature as that in the control chamber, and because of the relative size is somewhat larger so as to bias the socket member toward the ball.

This invention thereby provides a very responsive structure with a minmum of wear and a simple construction. No surface-to-surface contact of ball and socket is relied on for control, and force and pressure levels may readily be adjusted as desired. This joint is therefore non-binding even under end loads, which avoids transmission of lateral forces to the handle, and extends the life of the joint.

I claim:

1. A ball joint having a nominal central axis and comprising: a ball; a housing, the ball being adapted to be mounted to one object, and the housing to be mounted to another, whereby the joint will permit relative angular motion between the objects lateral to the axis, the housing including a cavity in which the ball is disposed; a cylinder wall bounding at least a part of the cavity; a pair of plunger socket members axially slidably fitted in said cylinder wall and each forming with the housing a fluid bias chamber on the side thereof opposite from the ball; a socket surface on each of said socket members facing the ball; a pair of spaced-apart peripheral seals extending between each of said socket surfaces and the adjacent ball, thereby forming a fluid control chamber therebetween, the lateral area of the bias chamber being greater than the lateral area of the control chamber; each said plunger socket member having a bore therein extending from said bias chamber; a pair of control valves; a poppet in each of said valves which is movable with the housing and extends into said bore in a respective one of said plunger socket members; control groove means in said bore and on said poppet in fluid communication with said control chamber; pressure supply means supplying pressure to the control valves; exhaust means in each said plunger socket member in fluid communication with said control groove means therein, the said control groove means being responsive to relative axial movement between said ball and housing whereby said control groove means in said poppet and said bore are moved relative to each other as the housing member shifts axially relative to said ball, whereby the pressure in the respective control chambers is controlled thereby maintaining said ball centered within said housing and out of direct contact with said plunger socket members, the bias chambers being fluidly connected to the respective control chambers, the control valves being in push-pull relationship with each other.

2. A ball joint according to claim 1 in which the pressure supply means includes a primary orifice upstream of the control chamber, and a secondary orifice between the control grooves and the control chamber.

3. A ball joint according to claim 1 in which the poppet is fluidly biased against the housing, and in which the control groove in the plunger socket member is vented.

4. A ball joint according to claim 3 in which the pressure supply means includes a primary orifice upstream of the control chamber, and a secondary orifice between the control grooves and the control chamber.

5. A ball joint according to claim 4 in which the said bore includes a stepped counterbore and in which the poppet fits both the bore and counterbore, and enclosed region of the counterbore being vented, whereby to bias the poppet against the housing.

6. A ball joint according to claim 4 in which the secondary orifice is carried by the poppet.

7. A ball joint according to claim 4 in which the region outside the ball and between the two plunger socket members is vented.

8. A ball joint according to claim 1 in which the control valve is upstream of both the control chamber and bias chamber, whereby pressure output from the control valve is supplied to both of said chambers, both of said chambers being vented through a restrictive orifice.

9. A ball joint according to claim 8 in which the poppet is fluidly biased against the housing.

10. A ball joint according to claim 9 in which the pressure supply means supplies both the supply groove in the plunger socket member and a poppet face directed away from the housing, whereby the poppet is fluidly biased against the housing.

11. A ball joint according to claim 10 in which the region outside the ball and between the two plunger socket members is vented.

References Cited
UNITED STATES PATENTS

| | | | |
|---|---|---|---|
| 2,377,196 | 5/1945 | Walley | 285—271 X |
| 2,421,691 | 6/1947 | Gibson et al. | 285—266 X |
| 2,998,999 | 9/1961 | Morser et al. | 308—122 |
| 3,236,544 | 2/1966 | Brown | 285—261 X |
| 3,271,086 | 9/1966 | Deffrenne | 308—122 X |

EDWARD C. ALLEN, *Primary Examiner.*

D. W. AROLA, *Assistant Examiner.*